United States Patent [19]

Willsey

[11] 3,820,301

[45] June 28, 1974

[54] EGG HANDLING APPARATUS

[75] Inventor: Charles H. Willsey, Maple Hill, Kans.

[73] Assignee: Seymour Foods, Inc., Topeka, Kans.

[22] Filed: Apr. 30, 1973

[21] Appl. No.: 355,310

[52] U.S. Cl......................... 53/62, 53/160, 53/246, 198/33 R
[51] Int. Cl....................... B65b 57/10, B65b 35/44
[58] Field of Search......... 53/62, 61, 160, 166, 246; 198/33 R

[56] References Cited
UNITED STATES PATENTS

| | | | |
|---|---|---|---|
| 3,148,761 | 9/1964 | Niederer et al.................... | 198/33 |
| 3,369,644 | 2/1968 | Niederer............................ | 198/33 |
| 3,592,001 | 7/1971 | Gross et al........................ | 53/62 X |

*Primary Examiner*—Travis S. McGehee
*Attorney, Agent, or Firm*—Guy A. Greenawalt

[57] ABSTRACT

An apparatus for packing eggs in pocketed containers, such as, cartons or filler flats, which apparatus includes a lower conveyor with a generally horizontal run disposed so as to receive in upwardly opening position successive empty containers, a dispensing mechanism at one end of the conveyor for supplying successive containers and an overhead mechanism to which eggs are fed from a cross conveyor on which the eggs are in random arrangement and from which the eggs are diverted onto a roller or spool conveyor so as to fill rows of pockets on the conveyor, the roller conveyor advancing the eggs to an orientor where the eggs are arranged with their long axes vertical and the small ends down on an associated cross bar conveyor, the latter conveyor having co-operating lane forming members which guide the eggs in properly spaced row arrangement as they are advanced to a container filling position at the end of the cross bar conveyor where mechanism guides the successive rows of eggs down over the end of the conveyor and into the pockets of a container which has been advanced on the lower conveyor to the filling position.

29 Claims, 15 Drawing Figures

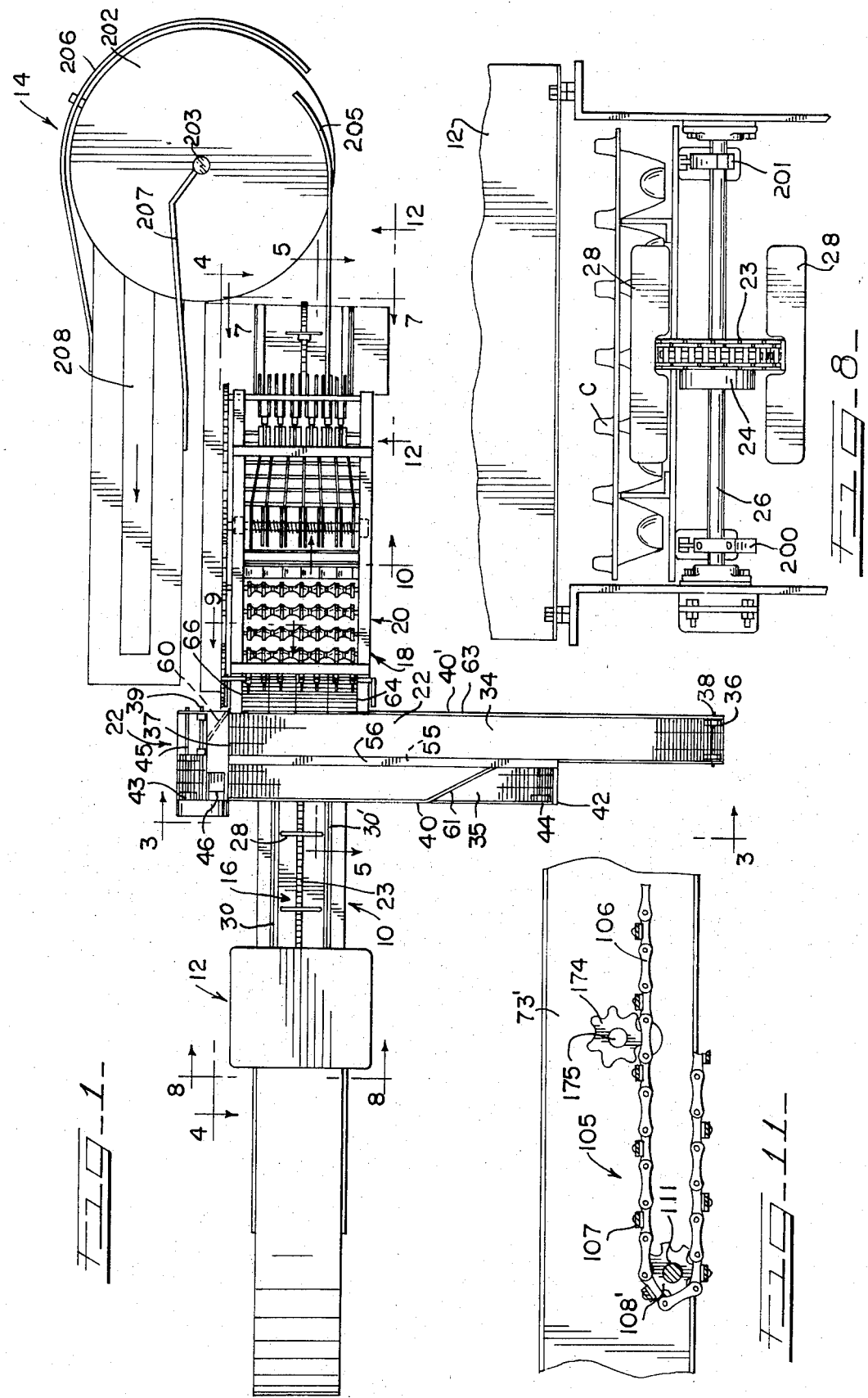

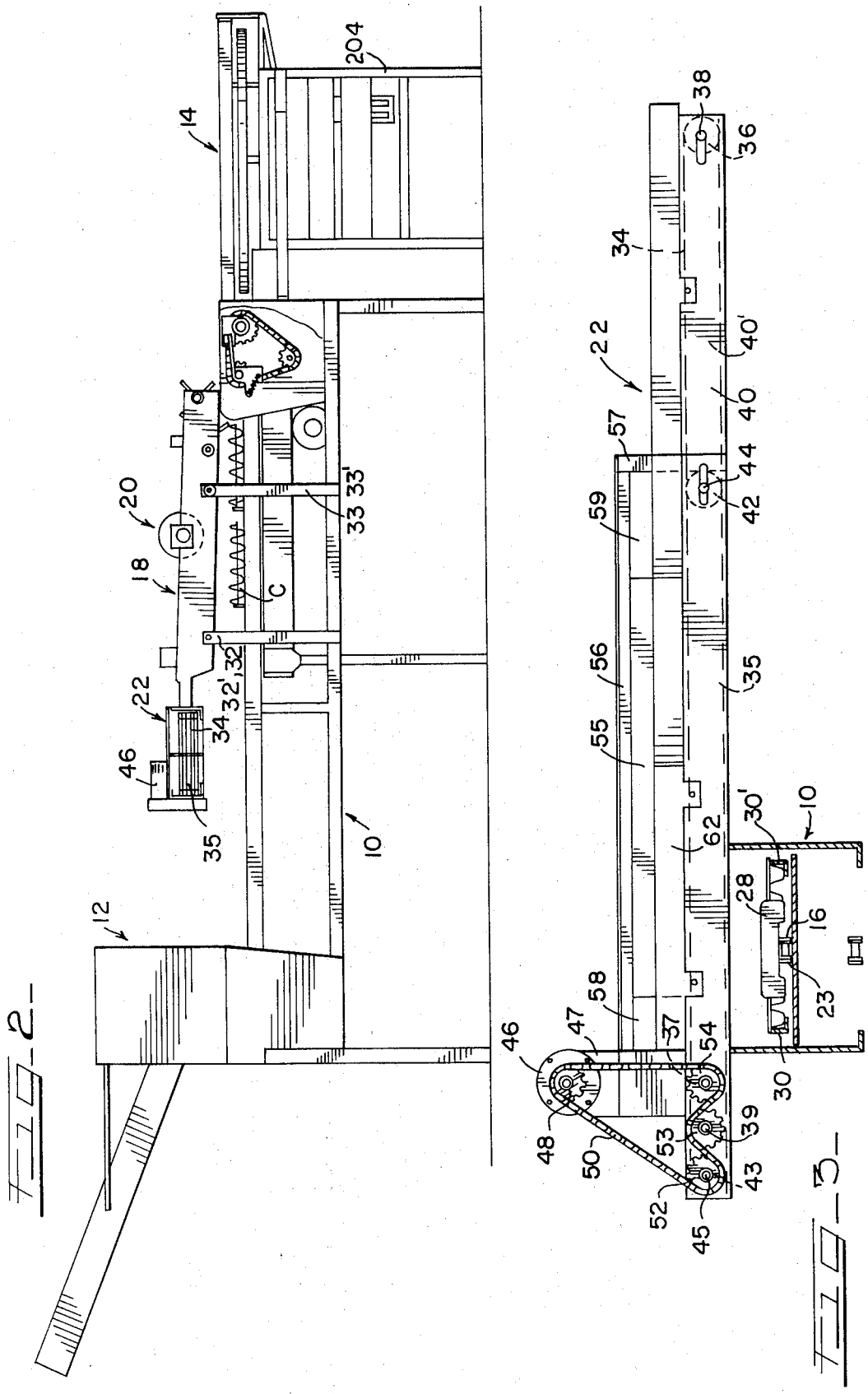

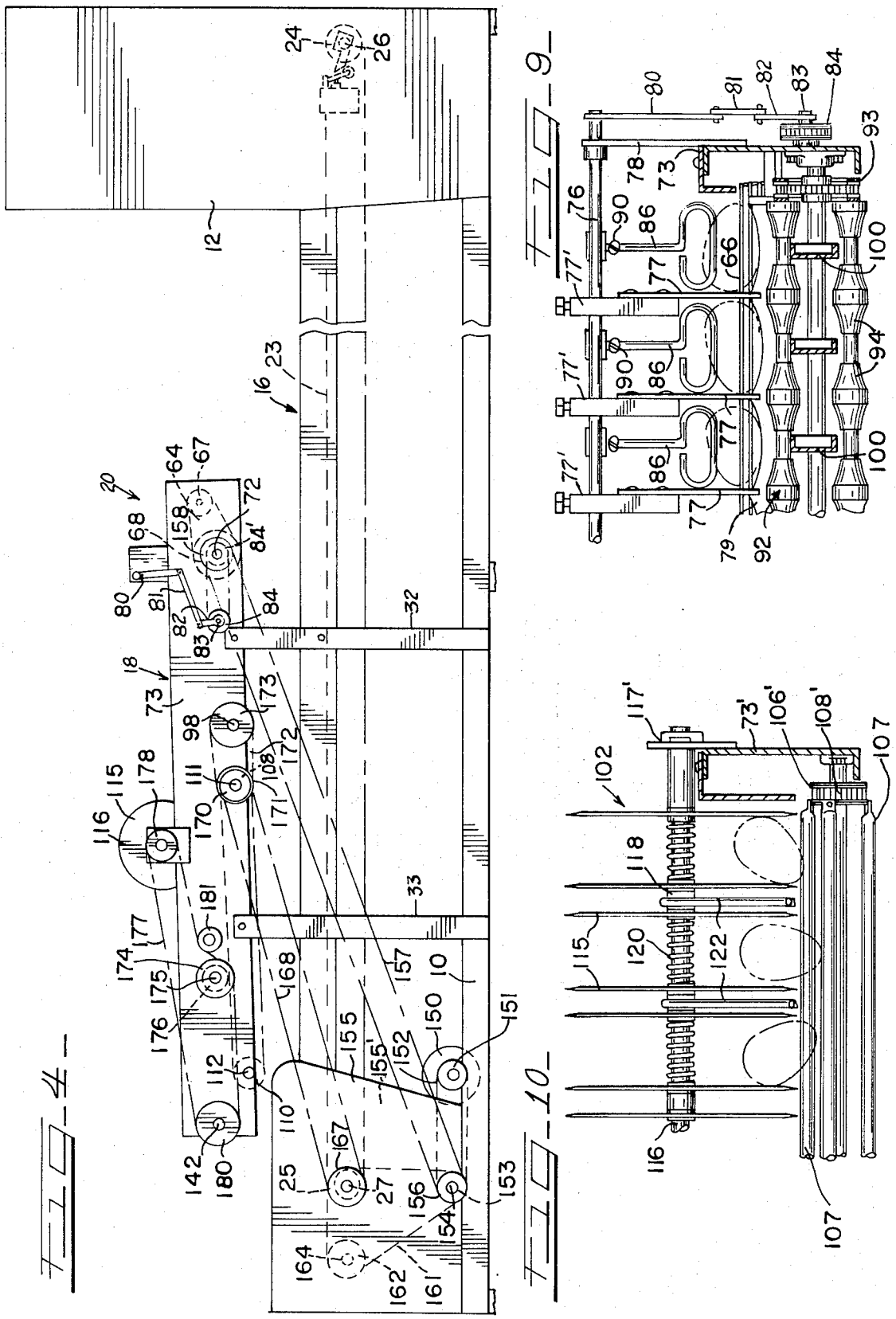

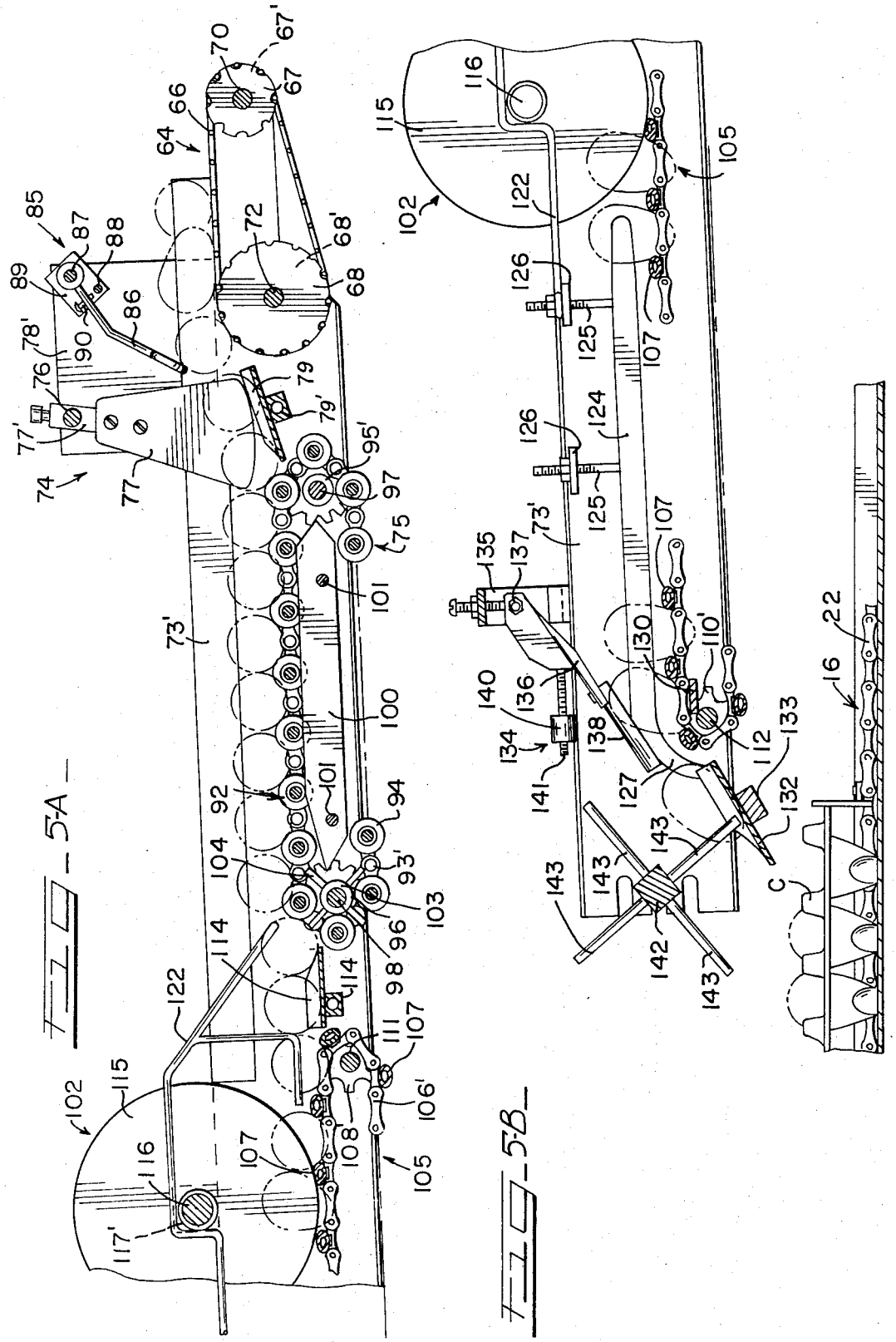

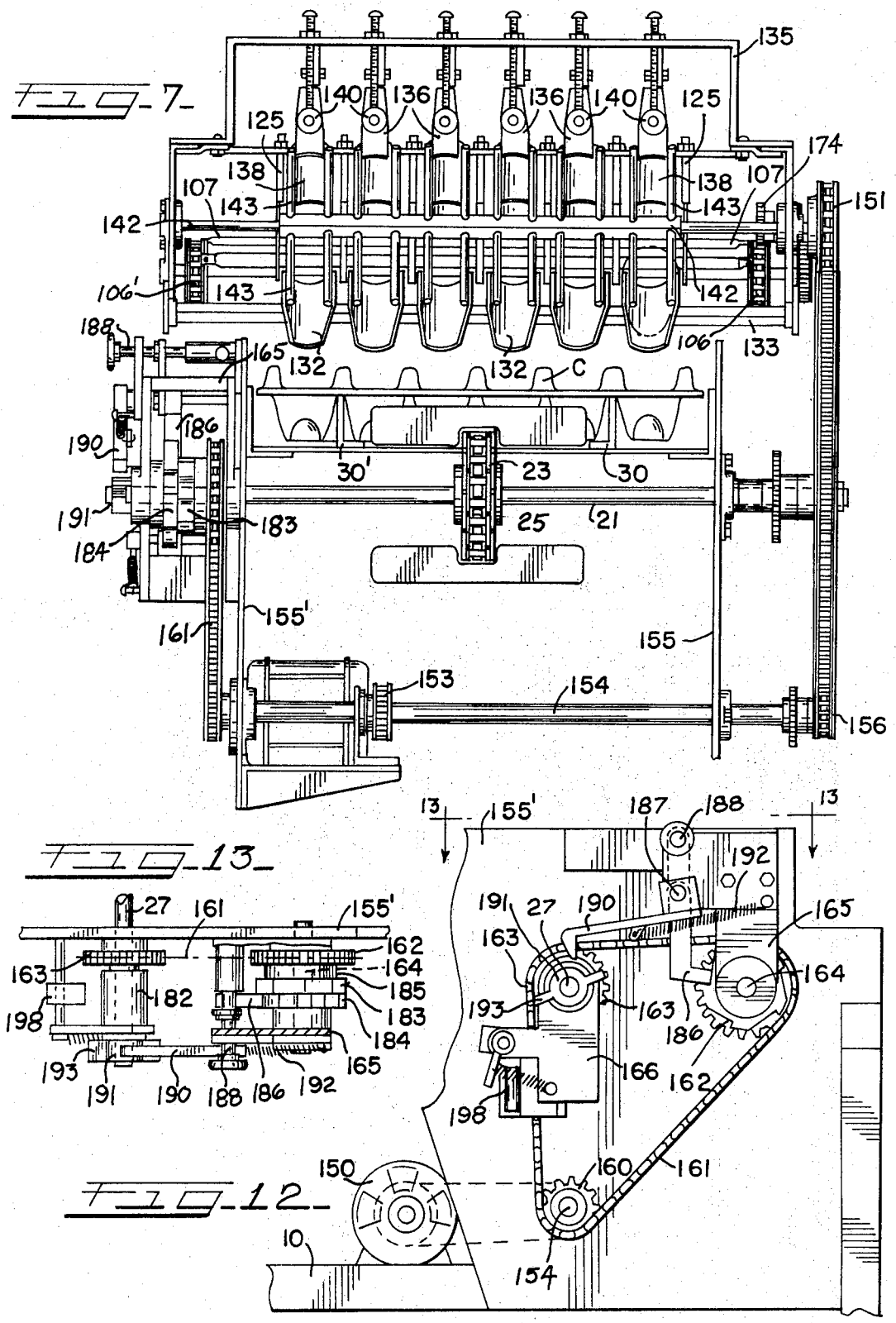

EGG HANDLING APPARATUS

This invention relates to article handling and is more particularly concerned with improvements in an apparatus for receiving eggs from a supply where they are in random arrangement and for orienting and arranging the eggs in properly spaced rows for deposit thereof in the pockets of a carton, filler flat or other receiving means.

Various machines have been developed heretofore for handling shell eggs so as to prepare the eggs, which are gathered from a hen house or other source for marketing, storage or processing. Large quantities of eggs are now obtained from egg farms which are operated so as to gather the eggs and deliver them to a central collecting point where they may be washed, sanitized, inspected and packed in pocketed containers, such as cartons or filler flats. Conventional filler flats are designed to receive five rows of six eggs each while the cartons most often used accommodate two rows of six eggs each. Egg washing machines have been provided which have sanitizing features and which will handle a large volume of eggs. Other machines have been developed for use in performing the several operations required for packing the eggs in cartons, filler flats or similar pocketed containers. Some of these machines include arrangements for candling, weighing and separating the eggs into groups of different weights for delivery to separate packing lines where the eggs are then packed following various procedures. In some arrangements the eggs may be packed without washing and/or without grading. Generally, these machines have been developed as single or separate units for performing one of the operations which may be carried out in preparation for packing. Development of egg farms and egg rooms where large quantities of eggs are made available for processing has made it desirable to develop machinery for mechanically handling the eggs so as to eliminate manual operations in preparing the eggs for marketing, storing or other processing, which machinery will operate efficiently and which will require a minimum of space for installation. It is a general object, therefore, of the present invention to provide a machine for use in packing eggs in pocketed containers which will accept eggs from a supply source such as a washing machine, grading apparatus, or the like, and which will orient the eggs, position or group them in properly spaced row arrangement and deposit the eggs in the pockets of a container.

It is a more specific object of the invention to provide an egg handling machine which feeds pocketed containers in upwardly open relation along a generally horizontal path to a filling station where eggs are deposited in full row complements in the pockets of the containers by an overhead mechanism which extends along and above the path of advance of the containers and which receives eggs in miscellaneous array from a supply source, arranges the eggs in rows of the same number as the pockets in the containers, orients the eggs to position them uniformly with the small ends down and guides the eggs in row arrangement to the filling station where they are handed down, over the end of a supporting conveyor, a row at a time, and deposited in the pockets of successive containers.

A still more specific object of the invention is to provide an apparatus for packing eggs in pocketed containers which comprises a conveyor having a run extending along a generally horizontal path with a means for depositing the empty cartons or filler flats thereon for advance beneath an overhead mechanism which extends above the path of said container conveyor, which receives eggs from a supply source in random arrangement and varying quantities, which positions the eggs in row arrangement on a conveyor and advances successive rows to an orienting apparatus which arranges the eggs with their long ends down from which the eggs are advanced in row alignment to the discharge end of a supporting conveyor where they are passed down, while maintained in row arrangement, and deposited in the pockets of the containers advanced on the conveyor beneath the same.

These and other objects and advantages of the invention will be apparent from a consideration of the egg handling apparatus which is shown by way of illustration in the accompanying drawings wherein:

FIG. 1 is a plan view of an egg handling apparatus which embodies the principles of the invention and which is suitable for use in an egg packing room at an egg farm or similar location;

FIG. 2 is a side elevation of the machine shown in FIG. 1;

FIG. 3 is a view taken on the line 3—3 of FIG. 1, showing the egg feeding apparatus at the infeed end of the machine;

FIG. 4 is a side elevational view, the view being taken on the lines 4—4 of FIG. 1, with portions omitted and with other portions broken away;

Figure 6:
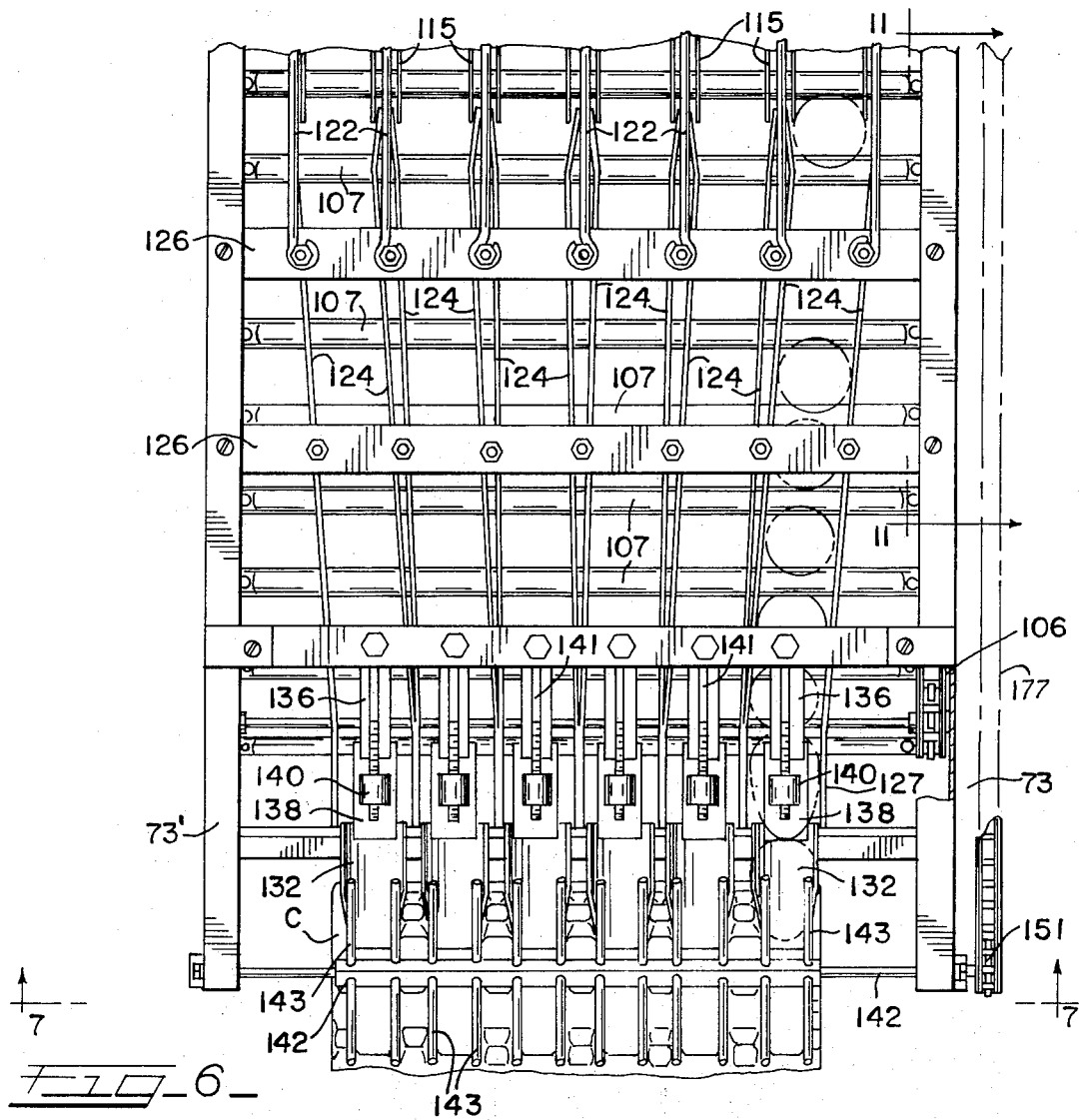

FIGS. 5A and 5B constitute a longitudinal cross section taken on the line 5—5 of FIG. 1, to an enlarged scale and with portions broken away;

FIG. 6 is a partial plan view, to an enlarged scale, at the discharge end of the egg handling apparatus;

FIG. 7 is a cross sectional view, to an enlarged scale, the view being taken on the line 7—7 of FIG. 1, at the discharge end of the egg handling apparatus;

FIG. 8 is a partial end elevational view, the view being taken on the line 8—8 of FIG. 1, to an enlarged scale;

FIG. 9 is a cross sectional view, taken on the line 9—9 of FIG. 1, to an enlarged scale;

FIG. 10 is a cross sectional view taken on the line 10—10 of FIG. 1, to an enlarged scale;

FIG. 11 is a fragmentary sectional view, taken on the line 11—11 of FIG. 6, to an enlarged scale;

FIG. 12 is a partial side elevational view, taken on the line 12—12 of FIG. 1, to an enlarged scale;

FIG. 13 is a fragmentary plan view taken on the line 13—13 of FIG. 12; and

Figure 14:
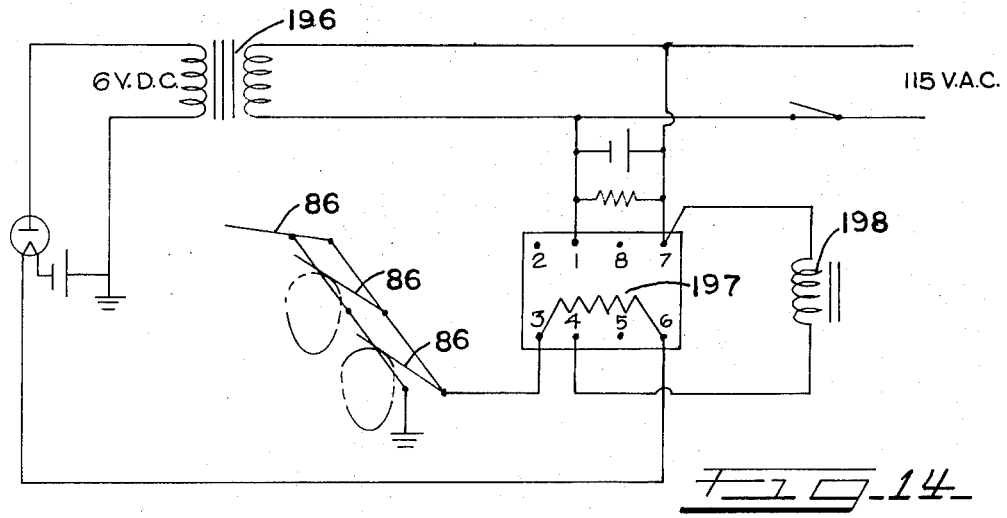

FIG. 14 is a schematic view illustrating an electrical control system for operating the machine.

Referring first to FIGS. 1, 2 and 3, there is illustrated an elongate lower conveyor supporting frame 10 having a carton dispensing mechanism 12 mounted at one end thereof. A discharge turntable 14 is mounted at the other end thereof for receiving filled cartons. A conveyor 16 is mounted in the supporting frame 10 for advancing cartons or filler flats from the dispensing mechanism 12 beneath an overhead frame 18 on which the egg handling mechanism 20 is mounted. An accumulator-type egg delivery conveyor mechanism 22 is mounted at the entrance end of the egg handling mechanism 20. Successive cartons or filler flats C are fed from the dispensing mechanism 12 and deposited on the top run of the supporting conveyor 16 with the egg receiving pockets thereof in upwardly opening relation and the egg receiving containers C are advanced beneath the egg handling mechanism 20. The operation of the mechanism 20 is controlled according to the supply of eggs and the advance of the container conveyor 16 is controlled according to the operation of mechanism 20. Eggs are delivered on the feed mechanism 22 to the entrance end of the egg handling mechanism 20 which arranges the eggs in rows, orients them so as to position them uniformly with the small end downward and delivers successive rows of six eggs each to the container filling station at the discharge end of the mechanism 20 where they are deposited in the pockets of the containers C in proper sequence and the filled containers are discharged onto the turntable 14.

Since the machine illustrated is designed to pack eggs in either cartons or filler flats, as desired, the container mechanism 12 at the infeed end of the container supporting conveyor 16 is of a type which may be adjusted to withdraw from a stack thereof either filler flats or cartons, one at a time, and deposit the same on the conveyor 16. A suitable container dispensing apparatus or mechanism which will operate in this manner is shown in U.S. Pat. No. 3,572,549, granted to Charles H. Willsey and Francis W. Majors, on Mar. 30, 1971.

The conveyor 16 (FIGS. 1 and 4) comprises an endless chain 23 mounted for travel along the center of the bottom frame structure 10 with the upper run thereof disposed generally horizontal. The chain 23 is carried on end sprockets 24 and 25 which are mounted on parallel cross shafts 26 and 27 journaled in side plates at opposite ends of the frame 10. The chain 23 carries a series of longitudinally spaced lugs 28 which are adapted to engage the trailing sides of the containers which are being dispensed for filling. Guide rail forming angle iron members 30, 30' are spaced on opposite sides of the top run of the chain 23 for guiding the containers in a straight path as they are advanced to a filling station at the end of the conveyor which is remote from the dispenser 12. The shaft 27 at the one end of the chain 23 is driven as hereinafter described.

The mechanism 20 (FIGS. 1 to 4) for orienting the eggs and arranging them in rows is carried on the upper frame structure 18 which is supported above the lower frame structure 10 by means of pairs of post forming members 32, 32' and 33, 33' upstanding from the frame structure 10 and supporting opposite ends of the frame 18 at different elevations so that the frame is inclined downwardly in the direction of advance of the eggs.

An accumulator conveyor mechanism 22 is mounted at the entrance end or infeed end of the egg handling mechanism 20 (FIGS. 1 and 3) which is preferably of the type disclosed in U.S. Pat. No. 3,258,105 granted to Charles H. Willsey and William B. Crawford, on June 28, 1966. The egg feeding mechanism 22 comprises a pair of endless belt conveyors 34 and 35, preferably a wire belt type, mounted with their upper runs in side-by-side coplanar relation. The longer infeed belt conveyor 34 on which the eggs are received in random arrangement is supported on pairs of end sprocket members 36 and 37 which are mounted on cross shafts 38 and 39, the latter being journaled in oppositely disposed side frame plates 40 and 40'. The shorter belt conveyor 35 is mounted on end sprocket members 42 and 43 carried on cross shafts 44 and 45 which are journaled in the frame side plates 40 and 40'. A drive motor 46 is mounted on an upstanding inverted U frame structure 47. The motor 46 (FIG. 3) has a power output sprocket 48 which drives chain 50 which engages sprockets 52, 53 and 54, the sprocket 54 being an idler sprocket. The sprocket 52 is mounted on the cross shaft 45 while sprocket 53 is mounted on the cross shaft 39 and the chain 50 engages sprockets 52 and 53 so that these shafts are driven in opposite directions. The top runs of the belt conveyors 34 and 35 are in substantially the same horizontal plane with travel in opposite directions as indicated by arrows thereon and these top runs are separated by a divider plate or egg separator plate 55 which is supported in depending relation from a longitudinally extending angle bar frame member 56, the latter having one end mounted on the top cross plate of the U frame 47 supporting the motor 46 and the other end mounted on a post 57 upstanding from the conveyor frame structure. The separator plate 55 has a length and is located so that there are openings 58 and 59 at opposite ends thereof for crossover of eggs from the conveyor 34 to the conveyor 35 at the leading end thereof and from the conveyor 35 back to the conveyor 34 at the leading end of the conveyor 35. A diverting bar 60 is mounted at the leading end of the conveyor 34 for directing excess eggs through the opening 58 onto the top run of the conveyor 35. There is a diverting bar 61 formed at the end of an upstanding outer side guide plate 62 for the top run of conveyor 35 which diverts eggs through opening 59 back onto the top run of conveyor 34. A guide plate 63 upstanding from the conveyor side frame plate 40' extends along the side of the top run of conveyor 34 and terminates at the side edge of a small wire belt conveyor 64 which is mounted at the entrance end of the mechanism 20. The belt of conveyor 34 is tilted sufficiently adjacent the leading end of the top run to cause eggs advancing on the conveyor 34 to be discharged normally onto the conveyor 64 with excess eggs being diverted by bar 60 to the belt 35 for return to belt 34.

The conveyor 64 (FIGS. 1, 4 and 5A) comprises a small endless wire belt 66 carried on pairs of end sprockets 67, 67' and 68, 68' which are mounted on cross shafts 70 and 72, the latter being spaced lengthwise of the mechanism 18 and supported at opposite ends in side frame plates 73 and 73'. The wire belt conveyor 64 may be inclined slightly in the direction of travel and is driven to advance the eggs to aligning and line forming mechanism 74 which guides the eggs into line and row alignment for delivery to the pockets of a roller conveyor 75.

The line and row forming mechanism comprises a cross shaft 76 on which a series of oscillating paddle members 77 are mounted in spaced relation. The shaft 76 is journaled in side plates 78, 78', upstanding from the frame side plates 73 and 73' and the depending paddle forming members 77 are mounted thereon by bracket members 77' which are secured in axially spaced relation on the cross shaft 76 so that the paddle members 77 are spaced apart a distance sufficient or a single egg to pass between each member and the adjacent member. The paddle members are formed of rubber or similar material and are in the form of truncated triangular plates in generally parallel planes so as to form six lanes or lines of eggs. A crossover pad 79 is mounted in fixed relation beneath the bottom edges of the paddles 77 on a cross bar 79' which is secured between the side frame plates 73 and 73'. The pad 79 is slanted downwardly and forwardly so as to support the eggs as they advance from the end of the conveyor 64 and pass between the paddle members 77 and onto the roller conveyor 75. The paddle members 77 are of relatively flexible material and the shaft 76 is oscillated so as to agitate the eggs as they are advanced by the conveyor 64 and roll by gravity across the pad 79 through the paddle area, with the paddle members being aligned relative to the pockets of the conveyor 75 so as to guide the eggs into the pockets in row alignment transversely of the conveyor 75. The cross shaft 76 carries a radial arm 80 at one end thereof which is pivotally connected at its free end to one end of a link bar 81, the latter having its other end pivotally connected to a short radial arm 82 on a small stub shaft 83 mounted on the one side frame plate 73. The shaft 83 has a sprocket 84 which is chain connected with a drive sprocket 84' on the end of the conveyor cross shaft 72 for the conveyor 64 which is driven as hereinafter described. The oscillation or oscillatory movement of the paddles 77 serves to arrange the eggs in proper position for delivery in rows to the roller conveyor 75.

The apparatus is designed to be operated with a sufficient supply of eggs to fill the pockets on the top run of the roller conveyor 75 and to maintain the same in filled condition. The eggs delivered to the conveyor 64 are advanced to the oscillating paddle mechanism 74 in a continuous stream of a width sufficient to maintain the required number of eggs in a row to keep the pockets in the conveyor 75 filled. The row forming and aligning mechanism 74 includes an egg sensing device 85 which operates as a switch in the electrical circuit controlling the operation of the apparatus. The device 85 comprises a series of finger members 86 depending from and pivotally mounted on the cross bar 87 which functions as one side of the switch. The cross bar 87 extends between the side plates 78 and 78' and is spaced from a parallel cross bar 88 which is mounted by means of insulating brackets 89 so that it is electrically insulated from the bar 87. Each of the egg engaging fingers 86 serves as an electrical conductor and carries a contact forming bolt or pin 90 which, in one position of the finger 86, when no egg is present, contacts the switch bar 88. When an egg moves into position at the end of the conveyor 64 it lifts the finger 86 which depends in its path and breaks the contact with the switch bar 88. Consequently, each of the fingers 86 which are aligned with the pockets in the roller conveyor 75 and the spaces between the pairs of paddles, will break contact with the bar 88 as an egg moves into place and is arrested by the egg ahead of it. When there is a full complement of eggs in the row and all the fingers 86 break contact the device operates as a switch to start the conveyor 75 and advance a row of eggs, making room for the eggs which follow to advance between the paddles 77 which in turn permits a new row to form under the sensing fingers 86.

Conveyor 75 (FIGS. 5A and 9) comprises a series of spool or roller carrying rod assemblies 92 which are rotatably mounted at opposite ends and in parallel relation on laterally spaced endless support chains 93 and 93'. Each roller assembly 92 is provided with axially spaced recesses 94 which co-operate with like recesses on adjacent rollers to form between each pair of said assemblies 92 a series of axially spaced pockets, six in number, for supporting the eggs with their long axes extending in a direction generally transverse of the path of the conveyor. The chains 93 and 93' are supported at opposite ends on pairs of sprockets 95, 95' and 96, 96' mounted on cross shafts 97 and 98 which are journaled in side plates 73 and 73'. A series of laterally spaced roller support bars 100 are mounted beneath the lower side of the upper run of the conveyor on cross bars 101 extending between the side frame plates 73 and 73'. The roller assemblies 92 contact the bars 100 and are rotated as the conveyor run advances the eggs so as to rotate the eggs in the pockets and insure that they are brought into relatively uniform position in the pockets as they are advanced to the orienting mechanism 102. The cross shaft 98 at the leading end of the roller conveyor 75 has mounted thereon a paddle wheel device 103 having radially extending paddles in the form of arms or blades 104 which extend between the pocket formations on the roller assemblies 92 as they approach and move around the shaft 98. These serve to prevent the eggs from settling too deeply into the pockets so that all the eggs in each row are discharged or lifted down over the end of the conveyor at the same time. The shaft 98 on the conveyor 75 is driven in synchronized relation with the next inline conveyor 105 which extends beneath the orienting mechanism 102, as shown in FIG. 5A.

The conveyor 105 (FIGS. 5A, 5B, 6 and 7) comprises a pair of endless chains 106, 106' which are laterally spaced and which carry a series of longitudinally spaced cross bars 107. The cross bars 107 are generally rounded and spaced apart a sufficient distance to support eggs lying thereon in either position, that is, with the longitudinal axis extending either transversely or vertically. The chains 106 and 106' are carried on pairs of end sprockets 108, 108' and 110, 110' mounted on cross shafts 111 and 112 which are in longitudinally spaced, parallel relation and extend between the side plates 73 and 73'. Shaft 111 is journaled in side plates 73 and 73' while shaft 112 is fixed with sprockets 110, 110' rotatable thereon. The entrance end of the cross bar conveyor 105 is located at a point spaced from the discharge end of the roller or spool conveyor 75 and the space is bridged by a transfer pad 114 extending across the support frame 30 and supported on a cross bar 114' which is mounted on the side plates 73 and 73'.

The orienting mechanism 102, (FIGS. 5A, 6 and 10), which is mounted above the entrance end of the conveyor 105, comprises a series of circular plate or disc members 115 supported in spaced relation on a cross shaft 116. The shaft 116 is journaled between the side frame plates 73 and 73' with the ends mounted in bearing members 117 and 117' on the side frame members 73 and 73'. The orienting discs 115 are arranged in pairs on the cross shafts 116. Each pair thereof is separated from the adjoining pair by a collar 118 and the discs of each pair thereof are normally held apart by compression springs 120 extending between the same. The discs 115 of each pair are normally spaced apart a distance somewhat less than the long dimension of an average size egg. The discs 115 are formed of a plastic, for example, a vinyl, with a tapered edge and with a center aperture of somewhat larger diameter than the diameter of the supporting shaft 116 so that each plate 115 may move axially on shaft 116 and may tilt to a limited degree relative to the axis of shaft 116, against the force of the spring 120. The shaft 116 is located above the level of the top run of the conveyor 105 so that the disc edges travel in a path immediately above the path of the cross bars 107 and the discs of each pair are spaced apart a distance less than the long axis dimension of an egg of average size. Each egg is received on the conveyor 105 between a pair of adjacent cross bars 107, after having passed across the transfer pad 114 and between separating guide wire or guide rod formations 122 with the long axis of the egg extending transversely of the conveyor. The guide formations 122 are disposed in parallel vertical planes and extend longitudinally of the conveyor. They are positioned approximately in the center of the spaces between pairs of discs and aligned relative to the pockets in the roller conveyor 75 so that an egg discharged from the conveyor 75 will be guided onto the conveyor 105 in position for it to be engaged on the uppermost surface by the peripheral edges of a pair of spaced discs 115. The resilient pressure resulting from the mounting of the plates on the shaft 116 and the force of the separating spring 120 will result in the egg being biased to a position on the conveyor with its larger end uppermost. The edges of the spaced rotating discs 115 will engage the egg adjacent its ends on opposite sides of the short axis and due to the difference in surface curvature the greater component of force will be applied to the smaller end and cause the latter to move down with the resulting upward movement of the larger end. As the conveyor is indexed forward, the eggs are advanced in longitudinal lines or rows and held in the oriented position by moving the same between transversely spaced and longitudinally extending bars or rod members 124 which serve as divider rails or lane forming members. The bars 124 are supported in depending relation on brackets 125 depending from cross bars 126 mounted on the frame members 73 and 73'. The one cross bar 126 serves to mount also the guide rod formations 122. The egg divider rails 124 have curved leading ends 127 which extend down over the discharge end of the conveyor 105. The rails 124, which are spaced to hold the eggs with their longer axes vertical as they are advanced to a container packing position or filling station at the end of the conveyor 105, also converge in the direction of the end of the conveyor 105 so as to bring the eggs into proper spaced relation in the rows for deposit in the pockets of the carton or filler flat C which is advanced to the filling station on the lower conveyor 16 (FIG. 5B).

A fixed ejector pad or series of pads 130 are mounted on the fixed cross shaft 112 at the discharge end of the conveyor 105 immediately below the top run thereof so as to insure that all of the eggs in a row are lifted as they reach the end of the conveyor to a position where they will all pass at once down over the end of the conveyor and onto the downwardly inclined slide pads or chute members 132. The chute forming slide pads 132 which are curved transversely, as shown, are mounted on a cross bar 133 extending between the side frame plates 73 and 73' immediately beyond the end of the conveyor 105 and are inclined downwardly. An egg holder device 134 is mounted at the end of the conveyor 105 for holding the eggs in row alignment and for tilting the eggs as they advance over the end of the conveyor and onto the slide pads 132 with the small ends down, so that, they will be deposited in the pockets of the container in proper position. The egg holding device 134 comprises a narrow cross bar support 135 on which a series of transversely spaced, bracket forming arm members 136 are pivoted at 137 for limited swinging movement in parallel vertical planes. Each arm 136 extends forwardly and downwardly above the end of the conveyor 105 and is aligned with the path of an advancing line of eggs. Each arm 136 has a pad of sponge rubber, or the like, 138 on the free end for engagement with the surface of an egg which is advanced by the conveyor 105 beneath the same. Each of the arms 136 has a balancing weight 140 adjustably mounted on a threaded pin 141 which insures that sufficient pressure will be applied to the top of the egg to hold it in proper position for discharge down onto the aligned chute 132.

A further provision for guiding the eggs in row formation down into the pockets in the container C comprises a cross bar 142 journaled at its ends in the side plates 73 and 73' and having mounted thereon four rows of axially spaced pairs of radial rods forming hand down or let down fingers 143 on which the eggs rest as the bar or cross shaft 142 is indexed and the eggs are guided onto the chute forming members 132. The fingers 143 are mounted in rows arranged 90° apart about the axis of the cross bar 142 and the let down finger bar or shaft 142 is indexed in synchronized relation with the movement of the conveyor 105 to hand down the eggs in row formation and allow the same to settle into the pockets in the packaging container which is at the filling station.

The power drive for the apparatus is shown in FIGS. 4 and 12. A motor 150 is mounted on the lower support frame 10 having an output sprocket 151 which is connected by a drive chain 152 with a sprocket 153 on the main drive shaft 154 which is journaled in side plates 155 and 155' at the end of the support frame 10. Drive shaft 154 carries a sprocket 156 (FIG. 4) at one side of the frame 10 which is connected by a drive chain 157 with a sprocket 158 mounted on the end of the cross shaft 72 on the upper frame 18, and serves as a power drive for the wire belt conveyor 64 and the mechainsm 74 for aligning the eggs. The power shaft 154 has a sprocket 160 on the opposite end (FIG. 12) which drives a chain 161 engaging sprockets 162 and 163. The sprocket 162 is mounted on a stub shaft 164 which is journaled in an inverted U-shaped bracket 165. The sprocket 163 is mounted on the one end of the cross shaft 27 which is extended through the U-shaped bracket 166. The shaft 27 of the container conveyor carries a sprocket 167 driving the chain 168 which engages the sprocket 170 on the end of the cross shaft 111 and drives the cross bar conveyor 105. A further sprocket 171 on the cross shaft 111 is connected by the chain 172 with a sprocket 173 on the end of the forward shaft 98 of the roller conveyor 75. The orienting apparatus 102 and the egg let down shaft 142 at the end of frame 30 are driven by the one chain 106 on the conveyor 105. A small sprocket 174 (FIGS. 4, 6 and 11) is mounted on a stub shaft 175 which is journaled in the frame side plate 73 so as to engage the sprocket 174 with the chain 106. A sprocket 176 on the shaft 175 drives an endless chain 177 as shown in FIG. 4. The chain 177 is trained over sprocket 178 on the shaft 116 for driving the orienting discs 115 and over sprocket 180 on the shaft 142 for driving the pin wheel carrying the egg let down fingers 143. An adjustably mounted idler sprocket 181 is provided for adjusting the tension in the chain 177.

As shown in FIGS. 12 and 13, there is a solenoid operated clutch 182 at the extended end of the shaft 27, which forms part of the automatic control system for the apparatus. Two ratchet indexing wheels 183 and 184 and a clutch 185 are mounted on the stub shaft 164 for controlling the indexing of the container carrying lower conveyor 16. A manually settable dog 186 is slidably mounted on a small cross rod 187 for selective cooperation with the indexing wheels 183 or 184 in providing for advance of the conveyor 16 according to the requirements for packing cartons or filler flats. The dog 186 is positioned on the support rod 187 for engaging indexing plate 183 or 184 by a manually slidable pull rod 188. The dog support rod 187 is journaled in the bracket 165 and carries at its outer end an arm 190, the free end of which engages a cam 191 on the end of shaft 27. A tension spring 192 urges the cam follower arm into engagement with the cam 191. The cam 191 has radial fingers 193 for operating the follower arm 190.

As shown in the diagram of FIG. 14, the operation of the mechanism for aligning, orienting and depositing the rows of eggs in the cartons or filler flats is controlled by the sensing fingers or arms 86. The main drive shaft 154 is driven continuously when the machine is operating and the chain 157 drives the egg infeed conveyor 64 and the associated aligning mechanism 74. The sensor arms 86 form a switch assembly in the circuit of FIG. 14. In the absence of eggs, the fingers 86 serve as closed switches in a rectified 6 volt circuit on the one side of transformer 196. The other side of the transformer 196 is connected to a 115 volt current line. The 6 volt circuit has a relay 197 which is held open when there is current in the circuit. The relay 197 serves as a switch in a 115 volt line which operates the solenoid 198 controlling the clutch 182. The solenoid line is opened and closed by actuation of the relay 197. When eggs are absent at the fingers 86 the relay 197 is activated to hold open the solenoid operating line. When there is a full complement of six eggs lifting all the fingers 86 the 6 volt line is grounded and the relay 197 is actuated to close the 115 volt solenoid operating line and the solenoid 198 is actuated which drives the shaft 27. The clutch 182 is a single revolution clutch and a single revolution of the shaft 27 advances the bottom conveyor 16 the distance between the container advancing cleats or pusher members 28. The clutch 185 and associated indexing or ratchet plates 183, 184 control the indexing of the conveyor 16 for each revolution of the clutch 182. The dog 186 is set to engage one or the other of the plates 183 and 184. When packing in dozen cartons, which have two rows of six pockets each, the conveyor 16 is indexed twice to advance a short space to enable the two successive rows to be filled and then a longer space to position the leading row of the following carton in the filling position. When packing in filler flats, the conveyor 16 is indexed to advance the filler flat successive short spaces to enable filling of the five rows and then a longer space to advance the next filler flat to the filling position.

The shaft 26 (FIG. 8) is provided with suitable cams 200 and 201 for operating micro-switches, one of which triggers the container dispensing device 12 so as to feed the filler flats in proper timed relation to the lugs 28 on the conveyor 16 while the other is provided for use when cartons are being packed to disable the mechanism 20 whenever the dispenser runs.

The apparatus illustrated includes a turntable assembly 14 arranged at the discharge end of the conveyor 16 comprising a circular plate 202 on a vertical shaft 203 supported on an upright frame structure 204, the shaft 203 being driven in a conventional manner by a motor or other power source, so as to take away the filled filler flats or cartons. Suitable side guides 205, 206, 207 are provided about the edge of the turntable plate 202 for directing the filled containers onto the top run of a belt conveyor 208 from which they are removed by the operator, the conveyor 208 being supported and driven in a conventional manner.

The apparatus illustrated is adapted for use where there is available a supply of eggs in condition for packing and it will be understood that the apparatus may be employed in combination with apparatus for washing, grading, candling or otherwise preparing eggs for marketing.

I claim:

1. An apparatus for packing eggs in containers having egg receiving pockets in row arrangement which apparatus comprises a lower conveyor assembly having means for advancing containers to a packing station, means at one end of said lower conveyor assembly for positioning successive empty containers thereon with the pockets in upwardly opening position and the rows thereof extending transversely of the path of advance, an upper conveyor assembly extending above said lower conveyor assembly with an egg discharge end at said packing station, means at the entrance end of said upper conveyor assembly for supplying eggs in random arrangement, means co-operating with said upper conveyor assembly for aligning the eggs in successive transverse rows and feeding them onto the top run of an entrance section of said upper conveyor assembly where they are arranged with the long axes extending transversely and advanced in transverse row alignment, an orienting mechanism adjacent the end of said conveyor entrance section, said orienting mechanism co-operating with a further conveyor section in arranging the eggs on the top run thereof and with the long axes vertical and the smaller ends on the bottom, means associated with said further conveyor section for guiding the eggs in longitudinal lines and in spacing the eggs in the rows so as to match the spacing of the pockets in the container which is advanced to the packing station, and means adjacent the end of said further conveyor section for guiding successive rows of eggs down around the end of said conveyor section and for depositing the eggs in the container pockets.

2. An apparatus for packing eggs in containers which have egg receiving pockets in row arrangement and which containers are advanced to a packing station, said apparatus comprising a conveyor assembly having an egg discharge end at said packing station, means at the opposite end of said conveyor assembly for supplying eggs in random arrangement, means for aligning the eggs in successive transverse rows and feeding them onto a top run of an entrance portion of said conveyor assembly where they are arranged with the long axes extending transversely and in transverse row alignment, an orienting mechanism co-operating with said conveyor in arranging the eggs with the long axes vertical and the smaller ends on the bottom, means associated with a discharge portion of said conveyor assembly for guiding the eggs in longitudinal lanes and in spaced relation in the rows corresponding to the transverse spacing of the pockets in a container at the packing station, and means at the discharge end of said conveyor assembly for guiding successive rows of eggs down around the end thereof and into the container pockets.

3. An apparatus for packaging eggs in containers as set forth in claim 2 wherein said means supplying eggs comprises an accumulator conveyor mechanism adapted to receive eggs from a supply source and advance the eggs to an area where they may accumulate in sufficient numbers to provide a constant supply for a multi-lane forming mechanism.

4. An apparatus for packaging eggs in containers as set forth in claim 2 wherein said egg aligning and feeding means comprises a continuously traveling belt type conveyor and a mechanism for guiding eggs advanced on said belt conveyor into a plurality of transversely spaced lanes.

5. An apparatus for packaging eggs in containers as set forth in claim 2 wherein said egg aligning and feeding means comprises a series of transversely spaced plate members and means to advance the eggs between pairs of said plate members so as to form the eggs into lanes for advance onto the entrance portion of said conveyor assembly.

6. An apparatus for packaging eggs in containers as set forth in claim 2 wherein said egg aligning and feeding means comprises a series of transversely spaced plate members mounted above the entrance end of said conveyor assembly with said plate members spaced apart a distance sufficient for a single egg to pass between the same so as to guide the eggs into a plurality of lanes.

7. An apparatus for packaging eggs in containers as set forth in claim 2 wherein said egg aligning and feeding means comprises a series of transversely spaced, paddle forming plate members mounted above the entrance end of said conveyor assembly which plate members are spaced apart a distance sufficient for a single egg to pass between the same and means is provided to oscillate said paddle forming plate members in planes extending in the direction of advance of the eggs so as to guide the eggs into a plurality of lanes, and wherein said conveyor assembly is adapted to receive successive rows of eggs which have been guided into lanes by said paddle forming plate members and to advance successive rows while maintaining the eggs in lane and row alignment.

8. An apparatus for packaging eggs in containers as set forth in claim 2 wherein said entrance portion of said conveyor assembly is adapted to receive a plurality of eggs in transversely aligned row formation and to advance the eggs while maintaining row alignment.

9. An apparatus for packaging eggs in containers as set forth in claim 2 wherein said entrance portion of said conveyor assembly comprises an endless traveling conveyor having a plurality of transversely extending, longitudinally spaced roller members shaped to provide a plurality of transversely aligned egg receiving pockets between each pair of adjacent roller members.

10. An apparatus for packaging eggs in containers as set forth in claim 2 wherein said conveyor assembly is constructed so as to support eggs in transversely extending rows.

11. An apparatus for packaging eggs in containers as set forth in claim 10 wherein said conveyor assembly comprises an endless entrance conveyor which provides for supporting eggs in longitudinally extending lanes and transverse row forming alignment and a further endless conveyor which provides for supporting eggs so that they may be pivoted about an axis extending lengthwise of the path of advance thereof.

12. An apparatus for packaging eggs in containers as set forth in claim 11 wherein said orienting mechanism is disposed for co-operation with said further endless conveyor in arranging the eggs with the long axes vertical and the smaller ends on the bottom and means for guiding the eggs into predetermined transversely spaced relation as they are advanced by said further conveyor.

13. An apparatus for packaging eggs in containers as set forth in claim 2 wherein said egg guide means at the discharge end of said conveyor assembly comprises means for retarding the forward movement of top portions of the eggs as they reach the end of the conveyor assembly so as to discharge the eggs over the end of the conveyor assembly in uniform inclined position.

14. An apparatus for packaging eggs in containers as set forth in claim 13 wherein said movement retarding means comprises a plurality of pad forming members pivotally mounted on a support means and depending in the path of the eggs at the end of said means for guiding the eggs in longitudinal lanes.

15. An apparatus for packaging eggs in containers as set forth in claim 13 wherein said movement retarding means comprises a plurality of pad forming members pivotally mounted on a cross frame member above the discharge end of said conveyor assembly which depend in the path of the top portions of the eggs and which are adjustably counterbalanced so as to exert sufficient force on the eggs on the conveyor to tilt them in a longitudinal plane.

16. An apparatus for packaging eggs in containers as set forth in claim 2 wherein said egg guiding means at the discharge end of said conveyor assembly comprises downwardly inclined chute forming means spaced across the end of said conveyor assembly for guiding the individual eggs in each row thereof in a downwardly inclined path.

17. An apparatus for packaging eggs in containers as set forth in claim 16 wherein a plurality of pairs of radially extending fingers are mounted on a cross shaft above said chute forming means with each pair of fingers aligned with a lane in which the eggs are advanced so as to support the eggs in row alignment as they are delivered onto the chute forming means for gravity discharge into the container pockets.

18. An apparatus for packaging eggs in containers as set forth in claim 17 wherein a plurality of rows of said fingers are mounted in spaced relation about the circumference of said cross shaft.

19. An apparatus for packaging eggs in containers as set forth in claim 2 wherein said egg guiding means at the discharge end of said conveyor assembly comprises downwardly inclined chute forming means at the end of said conveyor assembly, means at the end of said conveyor assembly for supporting the bottom ends of the eggs as they reach the end of said conveyor assembly so as to insure that all the eggs in a row will be discharged over the end of the conveyor assembly simultaneously.

20. In an apparatus for packing eggs in rows of pockets in containers, means for positioning a container at a packing station, conveyor means for supporting and advancing the eggs, means co-operating with said conveyor means for arranging the eggs in transverse row alignment with the long axes vertical and the smaller ends on the bottom and for advancing the eggs in lanes to said packing station, said conveyor means having a top run on which the eggs are supported with a discharge end disposed above said packing station and co-operating means for guiding the eggs in successive rows down over the discharge end of said conveyor means for deposit in row formation in the container at said packing station.

21. In an apparatus as set forth in claim 20 wherein said means for guiding the eggs over the discharge end of said conveyor means comprises pad forming means at the discharge end of said conveyor means which is positioned to engage the bottom portions of the eggs so that the bottom end of all the eggs in a row are at the same elevation and will discharge simultaneously over the end of the conveyor assembly.

22. In an apparatus as set forth in claim 20 wherein said means for guiding the eggs over the discharge end of said conveyor means comprises chute forming members disposed in downwardly inclined relation at the end of said conveyor assembly and means co-operating with said chute forming members for supporting the eggs while they are in the chute forming members and allowing the eggs to slide down the chute forming members in row formation.

23. In an apparatus as set forth in claim 20 wherein said means for guiding the eggs over the discharge end of said conveyor means comprises means for tilting the eggs as they reach the discharge end of the conveyor means so that the eggs will be maintained with the long axes vertical and the smaller ends down as the eggs are freed at the end of the conveyor assembly for deposit by gravity in the container.

24. In an apparatus as set forth in claim 20 wherein said means for arranging the eggs comprises lane forming guide members which guide the eggs as they advance so that the transverse spacing in each row corresponds to the transverse spacing of the pockets in the container at the packing station.

25. In an apparatus as set forth in claim 20 wherein said means for arranging the eggs comprises orienting means co-operating with said conveyor means to pivot the eggs about the shorter axes so as to bring the eggs into uniform arrangement with the smaller ends on the bottom.

26. In an apparatus as set forth in claim 20 wherein said means for guiding the eggs over the discharge end of said conveyor comprises a plurality of pad members mounted on pivotally supported arms depending from a cross frame and extending into the paths of top portions of the eggs so as to engage the eggs and tilt them into proper position for uniform discharge over the end of the conveyor means whereby the eggs will drop by gravity into the pockets of the container with each egg in the same relative position it occupied while on the conveyor means.

27. An apparatus for packing eggs in containers which have egg receiving pockets in row arrangement which apparatus comprises a lower conveyor assembly for advancing containers to a packing station and having means at one end for positioning successive empty containers thereon with the pockets in upwardly opening position, an upper conveyor assembly extending above said lower conveyor and having an egg discharge end at said packing station, means at the opposite end of said upper conveyor assembly for supplying eggs thereto, means for alining the eggs in successive transverse rows and feeding them onto the top run of said conveyor assembly in transverse row alignment, an orienting mechanism for arranging the eggs with the long axes vertical and the smaller ends on the bottom, means for guiding the eggs in longitudinal lines and in spaced relation in the rows corresponding to the spacing of the pockets in the container which is advanced to the packing station, means at the end of said conveyor assembly for guiding successive rows of eggs down around the end of the conveyor section for deposit in the container pockets, means for driving the conveyor assemblies, and control means for operating the drive means so as to deposit successive rows of eggs in the rows of container pockets when the containers are advanced to the packing station and in position to receive the rows of eggs.

28. An apparatus as set forth in claim 27 wherein said control means for operating the conveyor drive means includes a series of sensors at the entrance to the upper conveyor assembly which are operative to actuate the conveyor drive means when a full row of eggs is present for delivery to the conveyor assembly.

29. An apparatus as set forth in claim 27 wherein said control means includes manually settable indexing means for operating the conveyor assemblies to provide for depositing rows of eggs in containers having different row arrangements.

* * * * *